United States Patent
Tsirkin

(10) Patent No.: US 9,734,016 B2
(45) Date of Patent: Aug. 15, 2017

(54) SECURE LIVE VIRTUAL MACHINE GUEST BASED SNAPSHOT RECOVERY

(71) Applicant: Red Hat Israel, Ltd., Ra'anana (IL)

(72) Inventor: Michael Tsirkin, Yokneam Illit (IL)

(73) Assignee: Red Hat Israel, Ltd., Ra'anana (IL)

( * ) Notice: Subject to any disclaimer, the term of this patent is extended or adjusted under 35 U.S.C. 154(b) by 208 days.

(21) Appl. No.: 14/630,204

(22) Filed: Feb. 24, 2015

(65) Prior Publication Data

US 2016/0246681 A1 Aug. 25, 2016

(51) Int. Cl.
*G06F 12/00* (2006.01)
*G06F 13/00* (2006.01)
*G06F 11/14* (2006.01)
*G06F 3/06* (2006.01)

(52) U.S. Cl.
CPC .......... *G06F 11/1451* (2013.01); *G06F 3/065* (2013.01); *G06F 3/0619* (2013.01); *G06F 3/0665* (2013.01); *G06F 3/0689* (2013.01); *G06F 11/1469* (2013.01); *G06F 2201/815* (2013.01)

(58) Field of Classification Search
None
See application file for complete search history.

(56) References Cited

U.S. PATENT DOCUMENTS

| | | | |
|---|---|---|---|
| 8,166,265 B1 | 4/2012 | Feathergill | |
| 8,332,689 B2 | 12/2012 | Timashev et al. | |
| 8,458,419 B2 | 6/2013 | Basler et al. | |
| 8,719,631 B2 | 5/2014 | Tsirkin et al. | |
| 8,725,689 B1 | 5/2014 | Koryakina et al. | |
| 2010/0037031 A1* | 2/2010 | DeSantis | G06F 11/1464 711/162 |
| 2012/0102016 A1* | 4/2012 | Balogh | G06F 9/505 707/706 |
| 2012/0272238 A1 | 10/2012 | Baron | |
| 2012/0291021 A1* | 11/2012 | Banerjee | G06F 8/665 717/173 |
| 2013/0054932 A1* | 2/2013 | Acharya | G06F 3/0605 711/202 |

(Continued)

OTHER PUBLICATIONS

Owings, "Salvaging corrupt VMware guest OS data with VMDK snapshots", http://searchvmware.techtarget.com/tip/Salvaging-corrup-WMware-guest-OS-data-with-VMDK-snapshots (5 pages).

(Continued)

*Primary Examiner* — Sean D Rossiter
(74) *Attorney, Agent, or Firm* — K&L Gates LLP

(57) ABSTRACT

A system, method, and apparatus for secure live virtual machine guest based snapshot recovery. A virtual machine sends a request to access a snapshot of a first virtual disk of the virtual machine including a snapshot identifier. A hypervisor selects the snapshot using the snapshot identifier and creates a second virtual disk using the snapshot. The hypervisor then maps the second virtual disk to the virtual machine and notifies the virtual machine that the snapshot on the second virtual disk is accessible. The virtual machine accesses the snapshot on the second virtual disk including retrieving snapshot data from the second virtual disk without reverting a current virtual machine instance on the first virtual disk to the snapshot on the second virtual disk.

20 Claims, 5 Drawing Sheets

(56) References Cited

U.S. PATENT DOCUMENTS

| | | | |
|---|---|---|---|
| 2013/0238562 A1* | 9/2013 | Kumarasamy | G06F 17/30088 707/649 |
| 2013/0247045 A1* | 9/2013 | Fitzgerald | G06F 9/455 718/1 |
| 2014/0095817 A1* | 4/2014 | Hsu | G06F 11/1438 711/162 |
| 2014/0149696 A1 | 5/2014 | Frenkel et al. | |
| 2014/0258238 A1 | 9/2014 | Jin et al. | |
| 2014/0331226 A1 | 11/2014 | Arcese et al. | |
| 2015/0134617 A1* | 5/2015 | Bloom | G06F 11/1448 707/649 |
| 2015/0207749 A1* | 7/2015 | Cao | H04L 41/0896 709/226 |
| 2015/0312356 A1* | 10/2015 | Roth | G06F 11/3006 709/226 |
| 2016/0378528 A1* | 12/2016 | Zamir | G06F 9/45558 711/162 |

OTHER PUBLICATIONS

How to: Restore VM hard disk files in VMware to different datastores; Maria Levkina, Veeam Blog; Jan. 13, 2014; http://www.veeam.com/blog/how-to-restore-vm-hard-disk-files-in-vmware-to-different-datastores.html (6 pages).

* cited by examiner

SECURE LIVE VIRTUAL MACHINE GUEST BASED SNAPSHOT RECOVERY

BACKGROUND

Virtualization may be used to provide some physical components as logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate.

Virtualization may be achieved by running a software layer, often referred to as hypervisor, above the hardware and below the virtual machines. A hypervisor may run directly on the server hardware without an operating system beneath it or as an application running on a traditional operating system. A hypervisor may virtualize the physical layer and provide interfaces between the underlying hardware and virtual machines. Processor virtualization may be implemented by the hypervisor scheduling time slots on one or more physical processors for a virtual machine, rather than a virtual machine actually having a dedicated physical processor.

SUMMARY

The present disclosure provides a new and innovative system, methods and apparatus for secure live virtual machine guest based snapshot recovery.

In an example embodiment, a system includes memory, a processor in communication with the memory, a virtual machine executing on the processor, and a hypervisor executing on the processor. The virtual machine sends a request to access a snapshot of a first virtual disk of the virtual machine including a snapshot identifier. The hypervisor selects the snapshot using the snapshot identifier and creates a second virtual disk using the snapshot. The hypervisor then maps the second virtual disk to the virtual machine and notifies the virtual machine that the snapshot on the second virtual disk is accessible. The virtual machine accesses the snapshot on the second virtual disk including retrieving snapshot data from the second virtual disk without reverting a current virtual machine instance on the first virtual disk to the snapshot on the second virtual disk.

Additional features and advantages of the disclosed method and apparatus are described in, and will be apparent from, the following Detailed Description and the Figures.

DETAILED DESCRIPTION OF EXAMPLE EMBODIMENTS

Figure 1:
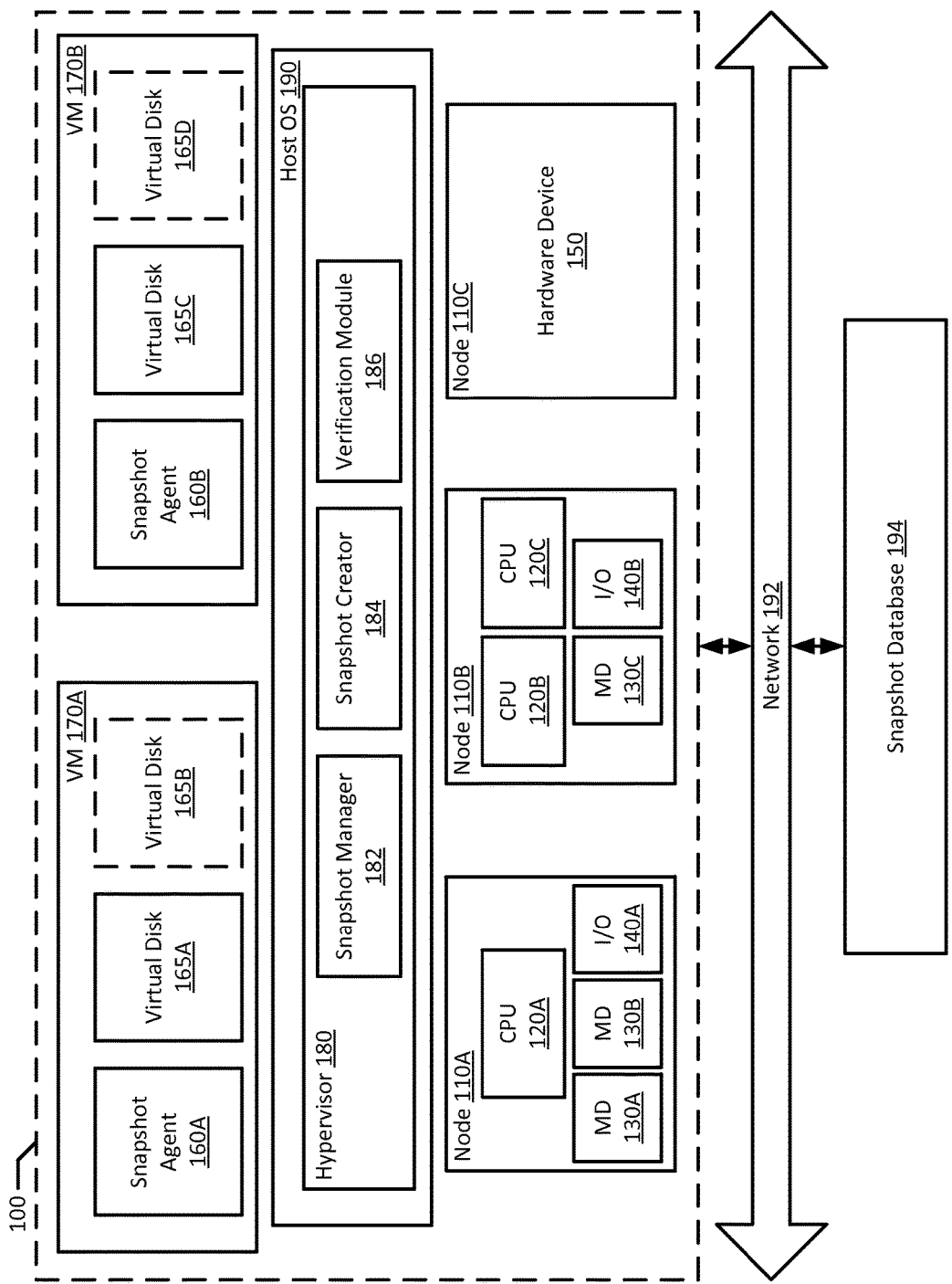
FIG. 1 is a block diagram of an example multiprocessor computer system according to an example embodiment of the present disclosure.

FIG. 1 depicts a high-level component diagram of an example multi-processor (or host) computer system 100 in accordance with one or more aspects of the present disclosure. The computer system 100 may include one or more interconnected nodes 110A-C. In an example embodiment, each node 110A-B may in turn include one or more physical processors (e.g., CPU 120A-C) communicatively coupled to memory devices (e.g., MD 130A-C) and input/output devices (e.g., I/O 140A-B). In an example embodiment, node 110C may include a hardware device 150. For example, a hardware device 150 may include a network device (e.g., a network interface controller (NIC), a network adapter, or any other component that connects a computer to a computer network), a memory device, a sound or video adaptor, a photo/video camera, a printer device, a keyboard, a display, etc.

As used herein, physical processor or processor 120A-C refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-C refers to a volatile or non-volatile memory device, such as RAM, ROM, EEPROM, or any other device capable of storing data. As discussed herein, I/O device 140A-B refers to a device capable of providing an interface between one or more processor pins and an external device capable of inputting and/or outputting binary data.

Processors 120A-C may be interconnected using a variety of techniques, ranging from a point-to-point processor interconnect, to a system area network, such as an Ethernet-based network. Local connections within each node 110A-C, including the connections between a processor 120A and a memory device 130A-B and between a processor 120A and an I/O device 140A may be provided by one or more local buses of suitable architecture, for example, peripheral component interconnect (PCI).

As noted above, computer system 100 may run multiple virtual machines (e.g., VM 170A-B), by executing a software layer (e.g., hypervisor 180) above the hardware and below the virtual machines 170A-B, as schematically shown in FIG. 1. In an example embodiment, the hypervisor 180 may be a component of the host operating system 190 executed by the computer system 100. In another example embodiment, the hypervisor 180 may be provided by an application running on the operating system 190, or may run directly on the host computer system 100 without an operating system beneath it. In yet another example embodiment, the hypervisor 180 may be external to the host operating system 190. The hypervisor 180 may virtualize the physical layer, including processors, memory, and I/O devices, and present this virtualization to virtual machines 170A-B as devices, including virtual processors, virtual memory (e.g. virtual disks), and/or virtual I/O devices. In an example embodiment, a virtual machine 170A-B may execute a guest operating system which may utilize the underlying virtual processors, virtual memory (e.g. virtual disks), and/or virtual I/O devices and manage programs and data of the virtual machine 170A-B.

Figure 2:
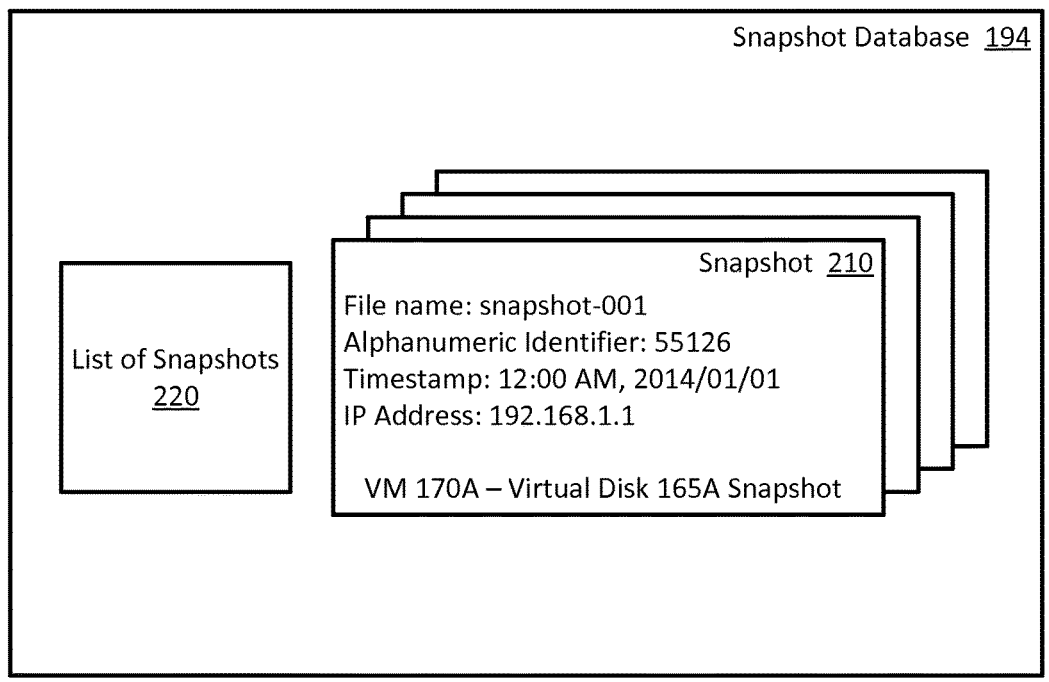
FIG. 2 is a block diagram of an example snapshot database according to an example embodiment of the present disclosure.

In an example embodiment, the hypervisor 180 may include a snapshot manager 182 that is configured to manage one or more snapshots 210 of virtual disks 165A-D. In an example embodiment, snapshots 210 may be stored on a snapshot database 194 as illustrated in FIG. 2 and described further below. A snapshot 210 of a virtual disk 165A-D is a file that captures a state of the virtual disk 165A-D of a virtual machine 170A-B at a point in time. For example, a snapshot 210 of a virtual disk 165A may capture any one or more of a memory state, register state, storage state, interrupt state, stack state, application state, program state, operating system state, etc., of an instance of a virtual machine 170A captured on a particular virtual disk 165A at a particular point in time. In an example embodiment, a live snapshot of a virtual disk 165A may be taken while the virtual machine 170A is executing. In an example embodiment, virtual disks 165B and 165D may not initially be mapped to virtual machines 170A and 170B (respectively), but may later be created and mapped to virtual machines 170A and 170B as described in greater detail below.

In an example embodiment, a snapshot manager 182 may manage receiving and responding to requests from a virtual machine 170A-B to access a snapshot 210. In an example embodiment, a snapshot manager 182 may retrieve a snapshot 210 from the snapshot database 194 and provide the snapshot to a virtual machine 170A-B. In an example embodiment, a snapshot manager 182 may allocate host system 100 resources, to create virtual disks 165A-D and store snapshots 210 on the virtual disks 165A-D. In an example embodiment, a snapshot manager 182 may provide a list of snapshots 220 to a virtual machine 170A-B. In an example embodiment, the above described actions by the snapshot manager 182 may be responsive to a request from a virtual machine 170A-B.

In an example embodiment, the hypervisor 180 may include a snapshot creator 184 that is configured to create snapshots 210 of virtual disks 165A-D. In an example embodiment, the snapshot creator 184 may create a snapshot 210 of virtual disks 165A-D in response to a request from a virtual machine 170A-B. In an example embodiment, the snapshot creator 184 may create a snapshot 210 responsive to a request from a snapshot manager 182, a hypervisor 180, or a host operating system 190. In an example embodiment, the snapshot creator 184 may create a snapshot 210 according to a snapshot schedule that indicates times at which a snapshot 210 should be created. In an example embodiment, upon creation of a snapshot 210, the snapshot creator 184 may store the snapshot 210 in the snapshot database 194.

In an example embodiment, the hypervisor 180 may include a verification module 186 configured to determine whether a virtual machine 170A-B is authorized to create a snapshot 210, access a snapshot 210, and/or access a list of snapshots 220. For example, a request to create a snapshot 210, access a snapshot 210, and/or access a list of snapshots 220 may include credentials authenticating and authorizing the requesting virtual machine 170A-B. In an example embodiment, prior to responding to a snapshot request from a virtual machine 170A-B, the snapshot manager 182 may verify the request using the verification module 186. In an example embodiment, the verification module 186 may be used to determine whether software of the requested snapshot 210 is compatible with the software of a current instance of the requesting virtual machine 170A-B. For example, the verification module 186 may determine whether the operating system version captured by the snapshot 210 is compatible with the operating system currently executing on the virtual machine 170A-B.

In an example embodiment, the snapshot manager 182, snapshot creator 184, and/or verification module 186 may be one module, rather than separate modules as illustrated in FIG. 1. In another example embodiment, the snapshot manager 182, snapshot creator 184, and/or verification module 186 may be external to hypervisor 180.

In an example embodiment, a virtual machine 170A-B may include a snapshot agent 160A-B configured to communicate with the hypervisor 180. For example, a snapshot agent 160A-B may provide snapshot requests and credentials to a snapshot manager 182 on the hypervisor 180 on behalf of the virtual machine 170A-B. In an example embodiment a snapshot request may be a request to create a snapshot 210, access a snapshot 210, access a list of snapshots 220, etc. For example, the snapshot agent 160A-B may supply authentication credentials (e.g., a username and password, etc.) that the hypervisor 180 or verification module 186 can authenticate (e.g. using an Active Directory service).

FIG. 2 illustrates a snapshot database 194 storing one or more snapshots 210. The snapshot database 194 may also store one or more snapshot identifiers associated with each snapshot 210. In an example embodiment, a snapshot identifier may be used to identify and retrieve a particular snapshot. In an example embodiment, a snapshot identifier may include a unique file name, alphanumeric identifier, address (e.g. IP address), and/or a timestamp (e.g. time and date when the snapshot 210 for a virtual disk 165A-D was created) corresponding to each snapshot 210. In an example embodiment, the snapshot database 194 may be accessible over a network 192 or integrated in system 100.

Figure 3:
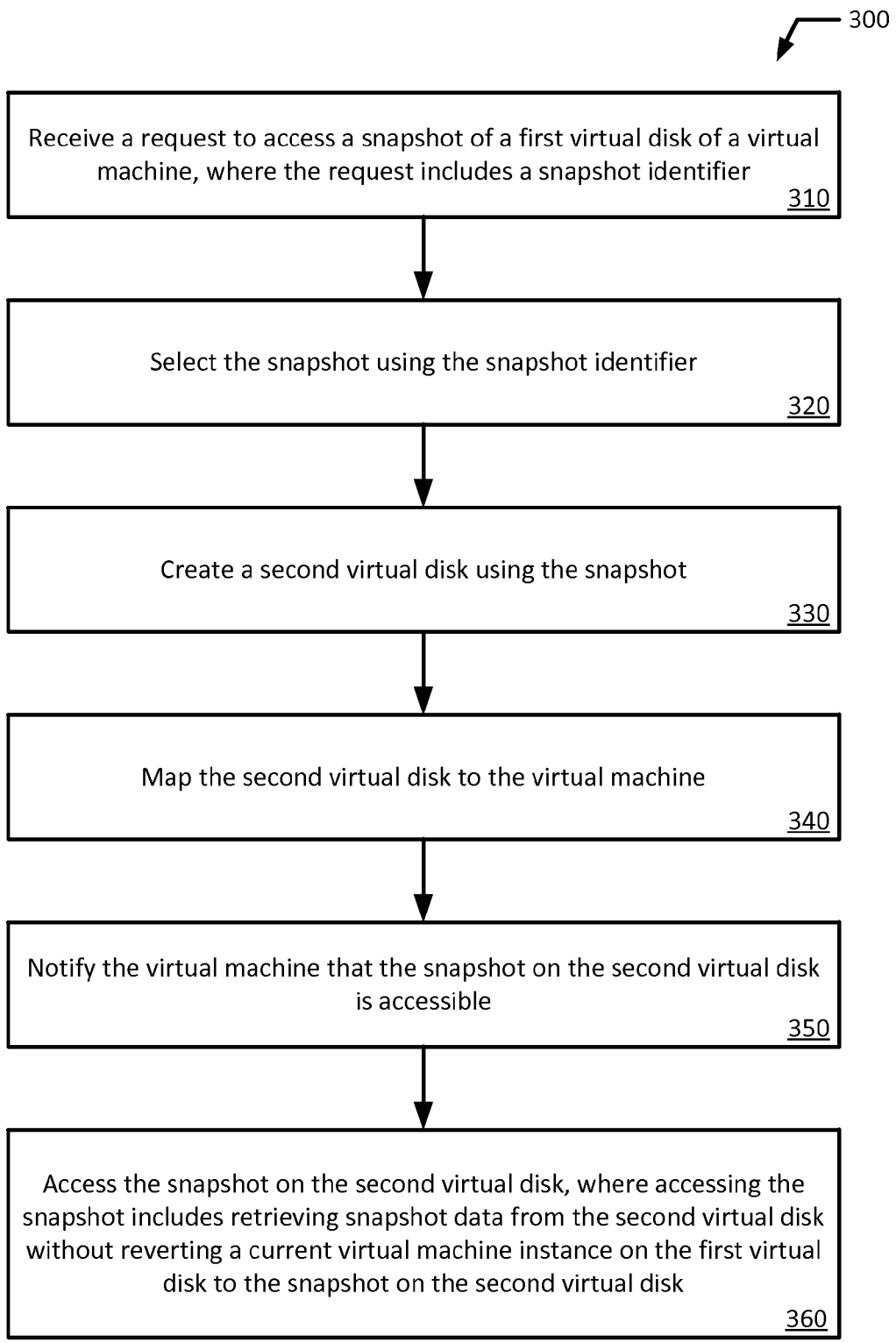
FIG. 3 is a flowchart illustrating an example process for secure live virtual machine guest based snapshot recovery according to an example embodiment of the present disclosure.

FIG. 3 illustrates a flowchart of an example method 300 for secure live virtual machine guest based snapshot recovery in accordance with an example embodiment of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both. In an example embodiment, the method is performed by a hypervisor 180.

The example method 300 starts and a request is received from a virtual machine 170A to access a snapshot 210 of a first virtual disk 165A of the virtual machine 170A, where the request includes a snapshot identifier (block 310). In an example embodiment, the snapshot identifier may include a snapshot file name, a snapshot alphanumeric identifier, a snapshot address (e.g. an IP address of the snapshot), and a snapshot timestamp. In an example embodiment, the snapshot timestamp may denote the exact timestamp of the snapshot 210 sought to be retrieved by the request. In another example embodiment, the snapshot timestamp may denote a time after which the snapshot 210 may be retrieved at the option of the snapshot manager 182. In yet another example embodiment, the snapshot timestamp may denote a time before which the snapshot may be retrieved at the option of the snapshot manager 182.

The hypervisor 180 selects a snapshot 210 using the snapshot identifier (block 320). In an example embodiment, the snapshot manager 182 on the hypervisor 180 may select and retrieve the snapshot 210 on snapshot database 194 using the snapshot identifier. The hypervisor 180 then creates a second virtual disk 165B using the selected snapshot 210 (block 330). In an example embodiment, the snapshot manager 182 on the hypervisor 180 may allocate memory from MD 130A and create the second virtual disk 165B. The snapshot manager 182 may then store the selected snapshot 210 on the second virtual disk 165B.

The hypervisor 180 maps the second virtual disk 165B to the virtual machine 170A (block 340). In an example embodiment, the hypervisor 180 may use one or more page tables (e.g. alternate page tables) to map a virtual disk (e.g. second virtual disk 165B) to the virtual machine 170A. The hypervisor 180 notifies the virtual machine 170A that the snapshot 210 on the second virtual disk 165B is accessible (block 350). In an example embodiment, the snapshot manager 182 on the hypervisor 180 may notify the snapshot agent 160A on the virtual machine 170A that the snapshot 210 is accessible.

The virtual machine 170A then accesses the snapshot 210 on the second virtual disk 165B, where accessing the snapshot 210 includes retrieving snapshot data from the second virtual disk 165B without reverting a current virtual machine instance on the first virtual disk 165A to the snapshot 210 on the second virtual disk 165B (block 360). In this manner, the virtual machine 170A may access the snapshot 210 while continuing to run a current instance of the virtual machine 170A on the first virtual disk 165A, without reverting to the snapshot 210. For example, the virtual machine 170A may selectively retrieve data from the snapshot 210 on the second virtual disk 165B without stopping the execution of the current instance on the first virtual disk 165A.

Figure 4A:
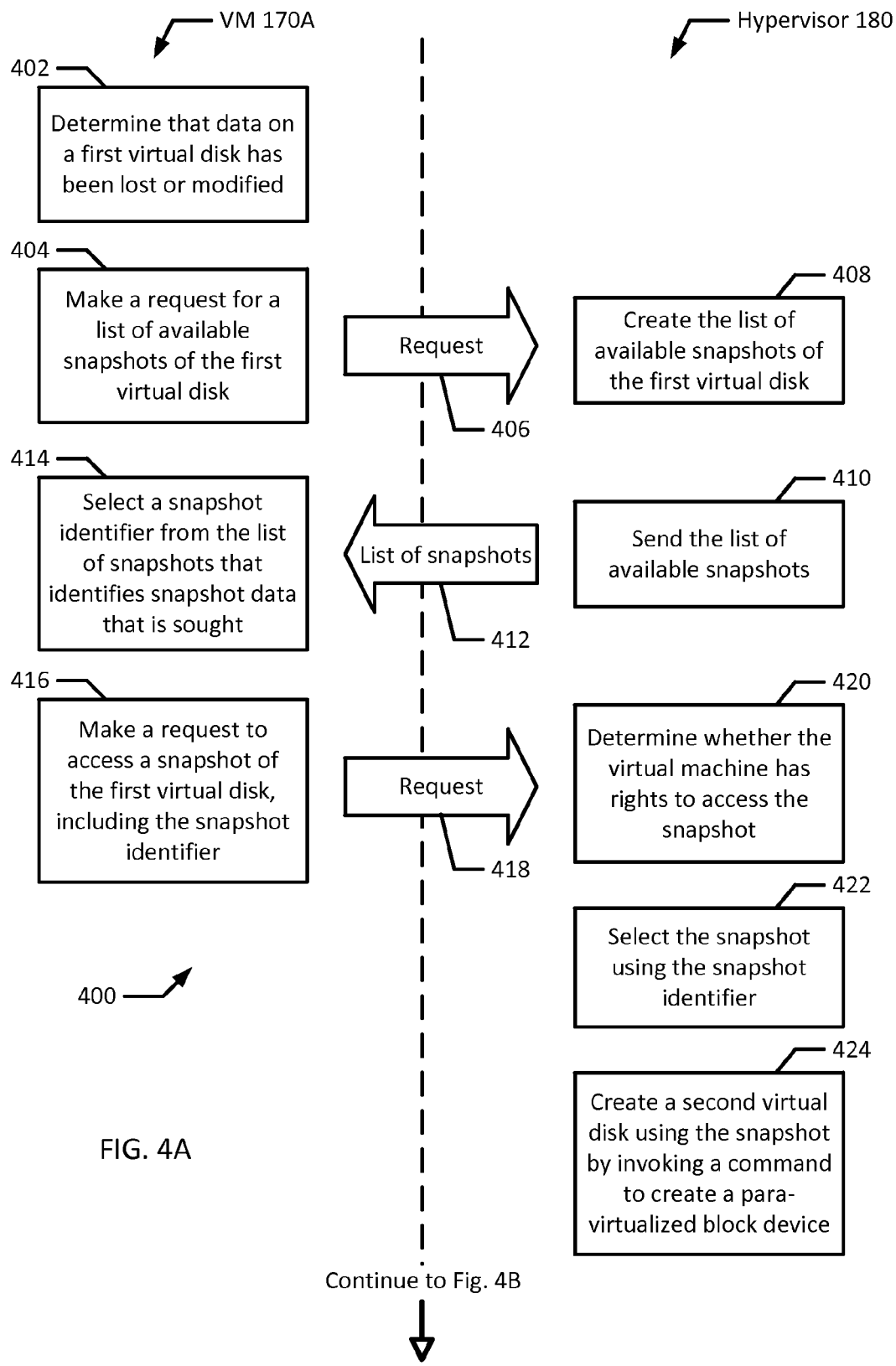
FIG. 4A is a flow diagram illustrating an example process for secure live virtual machine guest based snapshot recovery according to an example embodiment of the present disclosure.
Figure 4B:
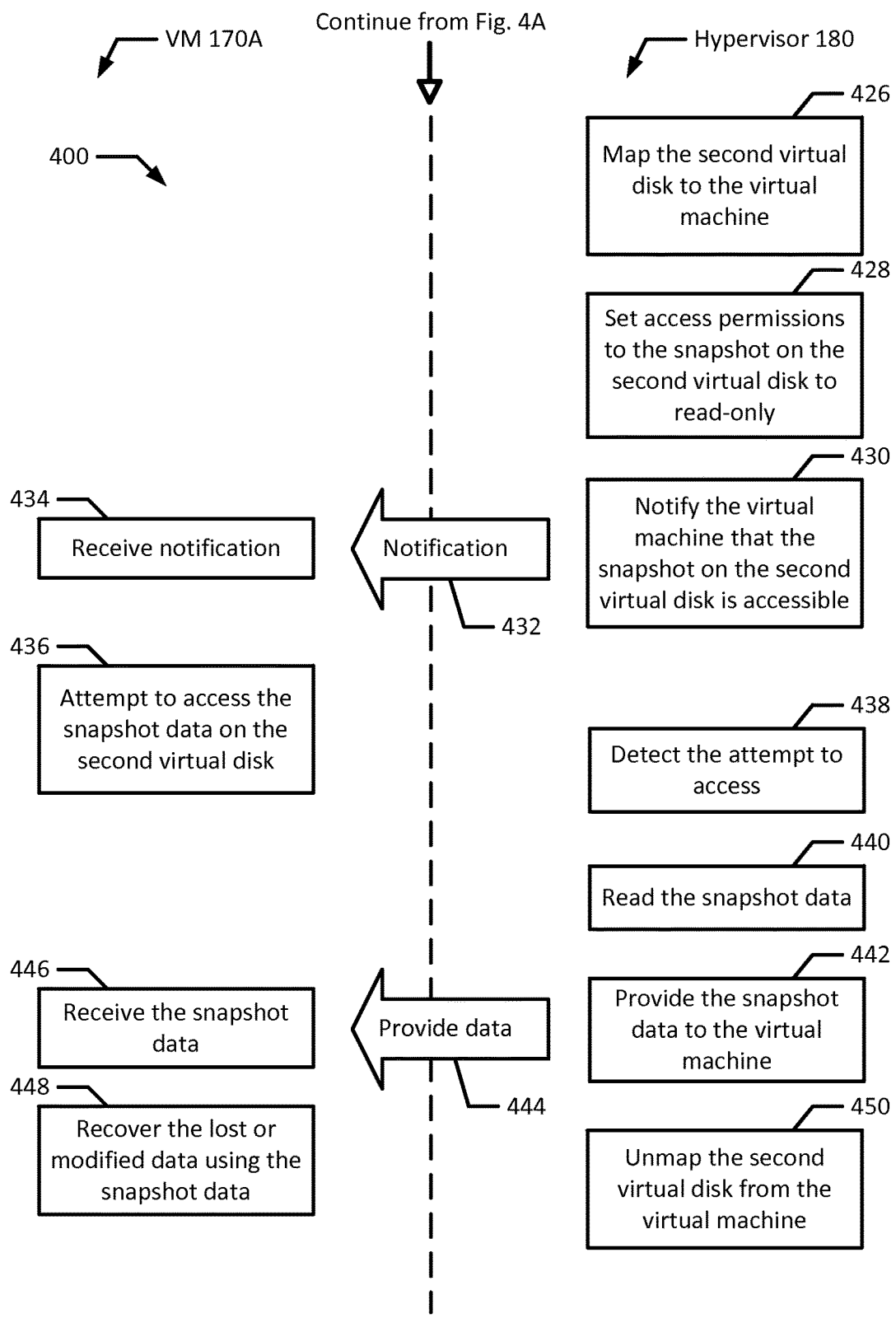
FIG. 4B is a flow diagram continuing the example process illustrated in FIG. 4A.

FIGS. 4A and 4B illustrate a flow diagram of an example method 400 for secure live virtual machine guest based snapshot recovery in accordance with an example embodiment of the present disclosure. Although the example method 400 is described with reference to the flow diagram illustrated in FIGS. 4A and 4B, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both.

In the illustrated example embodiment, a determination is made on a virtual machine 170A that data on a first virtual disk 165A has been lost or modified (block 402). For example, it may be determined that the data on the first virtual disk 165A has been corrupted. In an example embodiment, a user of the virtual machine 170A may determine that it is desirable to access a previous version of particular data without reverting the current instance of the virtual machine 170A on a first virtual disk 165A to an earlier snapshot 210. In an example embodiment, a user of the virtual machine 170A may determine that it is desirable to access a previous version of particular data without stopping the execution of a current instance of the virtual machine 170A on a first virtual disk 165A.

The virtual machine 170A makes a request for a list of snapshots 220 of the first virtual disk 165A (block 404). The virtual machine 170A transmits the request to the hypervisor 180 (block 406). Responsive to receiving the request, the hypervisor 180 creates a list of snapshots 220 of the first virtual disk 165A (block 408). In an example embodiment, the list of snapshots 220 is a list of snapshot identifiers for each of the available snapshots 210. In an example embodiment, the list of snapshots 220 may be stored in the snapshot database 194 and may be retrieved by the hypervisor 180 from the snapshot database 194 as illustrated in FIG. 2. In another example embodiment, rather than being stored on the snapshot database 194, the list of snapshots 220 may be assembled from the snapshot identifiers on the snapshot database 194 by the hypervisor 180 using the snapshot manager 182.

The hypervisor 180 then sends the list of snapshots 220 to the virtual machine 170A (blocks 410 and 412). In an example embodiment, the hypervisor 180 may only provide the list of snapshots 220 to the virtual machine 170A if the virtual machine 170A or a user of the virtual machine 170A has been authenticated. For example, the hypervisor 180 may use the verification module 186 to authenticate the virtual machine 170A or the user of the virtual machine 170A.

In another embodiment, rather than transmitting a request for a list of snapshots 220 or prior to transmitting a request for a list of snapshots 220, the virtual machine 170A may make a request to create a snapshot 210. Responsive to receiving the request to create a snapshot 210, the hypervisor 180 may authenticate received credentials of the virtual machine 170A or a user of the virtual machine 170A. If the virtual machine 170A is authenticated, the hypervisor 180 may create the snapshot 210. In an example embodiment, the hypervisor 180 may use the snapshot creator 184 to create the snapshot 210 and then store the newly created snapshot 210 in the snapshot database 194. In an example embodiment, after a period of time has elapsed, the virtual machine 170A may then make a request to access the newly created snapshot 210.

Responsive to receiving a list of snapshots 220, the virtual machine 170A selects a snapshot identifier from the list of snapshots 220 that identifies snapshot data sought by the virtual machine 170A (block 414). The virtual machine 170A then makes a request to access a snapshot 210 of the first virtual disk 165A including the snapshot identifier (e.g. alphanumeric identifier 55126) illustrated in FIG. 2 (block 416). The virtual machine 170A transmits the request to the hypervisor 180 (block 418). Responsive to receiving the request to access the snapshot 210, the hypervisor 180 determines whether the virtual machine 170A has rights to access the snapshot 210 (block 420). In an example embodiment, determining whether the virtual machine 170A has rights to access the snapshot 210 includes authenticating the virtual machine 170A or a user of the virtual machine 170A. In an example embodiment, determining whether the virtual machine 170A has rights to access the snapshot 210 includes determine whether the requested snapshot 210 is compatible with the currently running instance of the virtual machine 170A on the first virtual disk 165A.

If the hypervisor 180 determines that the virtual machine 170A has rights to access the requested snapshot 210, the hypervisor 180 selects the snapshot 210 using the snapshot identifier (block 422). In an example embodiment, the hypervisor 180 may use the snapshot manager 182 to select and retrieve the snapshot 210 from the snapshot database 194 using the snapshot identifier (e.g. alphanumeric identifier 55126). The hypervisor 180 then creates a second virtual disk 165B using the selected snapshot 210 by invoking a command to create a paravirtualized block device (block 424). In an example embodiment, the hypervisor 180 may invoke a hotplug command to create the paravirtualized block device. For example, the hypervisor may invoke the command add Virtio-blk device.

The flow diagram of example process 400 continues in FIG. 4B. Responsive to creating a second virtual disk 165B, the hypervisor 180 maps the second virtual disk 165B to the virtual machine 170A (block 426). For example, the hypervisor 180 generates a page table for the second virtual disk 165B and maps the page table to the virtual machine 170A. The hypervisor 180 then sets access permissions to the snapshot 210 on the second virtual disk 165B to read-only (block 428). In this manner, the virtual machine 170A is prohibited from modifying the selected snapshot 210. In an example embodiment, the hypervisor 180 may set access permissions for the snapshot 210 by modifying an access protection identifier of the page table corresponding to the second virtual disk 165B.

The hypervisor 180 then notifies the virtual machine 170A that the snapshot 210 on the second virtual disk 165B is accessible (block 430). The hypervisor 180 transmits the notification to the virtual machine (block 432). The virtual machine 170A receives the notification (block 434). Responsive to receiving the notification, the virtual machine 170A attempts to access snapshot data on the second virtual disk 165B (block 436). The hypervisor 180 detects the virtual machine 170A's attempt to access the snapshot data (block 438). The hypervisor 180 then reads the snapshot data on the second virtual disk 165B (block 440). The hypervisor 180 then provides the snapshot data to the virtual machine 170A (blocks 442 and 444). The virtual machine 170A receives the snapshot data from the hypervisor 180 (block 446). Responsive to receiving the snapshot data, the virtual machine 170A recovers the lost or modified (or corrupted) data using the snapshot data (block 448). In an example embodiment, the virtual machine 170A continues to execute the current instance of the virtual machine 170A on the first virtual disk 165A while accessing and receiving snapshot data on the second virtual disk 165B. The hypervisor 180 then unmaps the second virtual disk 165B from the virtual machine 170A (block 450).

In another example embodiment, the virtual machine 170A may directly access and retrieve snapshot data from the snapshot 210 on the second virtual disk 165B without the hypervisor 180 accessing the snapshot data on behalf of the virtual machine 170A. The virtual machine 170A may then recover the lost or modified (or corrupted) data using the snapshot data the virtual machine 170A directly retrieved from the snapshot 210. The hypervisor 180 may then unmap the second virtual disk 165B from the virtual machine 170A.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

Aspects of the subject matter described herein may be useful alone or in combination with one or more other aspects described herein. Without limiting the following description, in a first example aspect of the present disclosure, a system comprises a memory, a processor, in communication with the memory, a virtual machine executing on the processor, the virtual machine including at least one virtual disk, and the memory including at least one snapshot of the at least one virtual disk of the virtual machine, and a hypervisor, executing on the processors to receive, from the virtual machine, a request to access a snapshot of a first virtual disk of the virtual machine, wherein the request includes a snapshot identifier, select, by the hypervisor, the snapshot using the snapshot identifier, create, by the hypervisor, a second virtual disk using the snapshot, map, by the hypervisor, the second virtual disk to the virtual machine, notify, by the hypervisor, the virtual machine that the snapshot on the second virtual disk is accessible, and access, by the virtual machine, the snapshot on the second virtual disk, wherein accessing the snapshot includes retrieving snapshot data from the second virtual disk without reverting a current virtual machine instance on the first virtual disk to the snapshot on the second virtual disk. In accordance with another example aspect of the present disclosure, which may be used in combination with any one or more of the preceding aspects, the snapshot identifier is at least one of a snapshot file name, a snapshot alphanumeric identifier, a snapshot address, and a snapshot timestamp. In accordance with another example aspect of the present disclosure, which may be used in combination with any one or more of the preceding aspects, the snapshot timestamp denotes at least one of an exact time stamp of the snapshot, a time after which the snapshot must be selected, and a time before which the snapshot must be selected. In accordance with another example aspect of the present disclosure, which may be used in combination with any one or more of the preceding aspects, responsive to receiving the request the hypervisor determines whether the virtual machine has rights to access the snapshot, and responsive to determining that the virtual machine has rights to access the snapshot, selecting by the hypervisor, the snapshot using the snapshot identifier. In accordance with another example aspect of the present disclosure, which may be used in combination with any one or more of the preceding aspects, responsive to accessing the snapshot the hypervisor unmaps the second virtual disk from the virtual machine. In accordance with another example aspect of the present disclosure, which may be used in combination with any one or more of the preceding aspects, accessing, by the virtual machine, the snapshot on the second virtual disk includes recovering, by the virtual machine, snapshot data on the first virtual disk that has been lost or modified. In accordance with another example aspect of the present disclosure, which may be used in combination with any one or more of the preceding aspects, creating, by the hypervisor, the second virtual disk includes invoking, by the hypervisor, a command to create a para-virtualized block device.

In a second example aspect of the present disclosure, a method comprises receiving, from a virtual machine executing on a computer system, a request to access a snapshot of a first virtual disk of the virtual machine, wherein the request includes a snapshot identifier, selecting, by a hypervisor executing on the computer system, the snapshot using the snapshot identifier, creating, by the hypervisor, a second virtual disk using the snapshot, mapping, by the hypervisor, the second virtual disk to the virtual machine, notifying, by the hypervisor, the virtual machine that the snapshot on the second virtual disk is accessible, and accessing, by the virtual machine, the snapshot on the second virtual disk, wherein accessing the snapshot includes retrieving snapshot data from the second virtual disk without reverting a current virtual machine instance on the first virtual disk to the snapshot on the second virtual disk. In accordance with another example aspect of the present disclosure, which may be used in combination with any one or more of the preceding aspects, the snapshot identifier is at least one of a snapshot file name, a snapshot alphanumeric identifier, a snapshot address, and a snapshot timestamp. In accordance with another example aspect of the present disclosure, which may be used in combination with any one or more of the preceding aspects, the snapshot timestamp denotes at least one of an exact time stamp of the snapshot, a time after which the snapshot must be selected, and a time before which the snapshot must be selected. In accordance with another example aspect of the present disclosure, which may be used in combination with any one or more of the preceding aspects, responsive to receiving the request the hypervisor determines whether the virtual machine has rights to access the snapshot, and responsive to determining that the virtual machine has rights to access the snapshot, selecting by the hypervisor, the snapshot using the snapshot identifier. In accordance with another example aspect of the present disclosure, which may be used in combination with any one or more of the preceding aspects, responsive to accessing the snapshot the hypervisor unmaps the second virtual disk from the virtual machine. In accordance with another example aspect of the present disclosure, which may be used in combination with any one or more of the preceding aspects, accessing, by the virtual machine, the snapshot on the second virtual disk includes recovering, by the virtual machine, snapshot data on the first virtual disk that has been lost or modified. In accordance with another example aspect of the present disclosure, which may be used in combination with any one or more of the preceding aspects, creating, by the hypervisor, the second virtual disk includes invoking, by the hypervisor, a command to create a para-virtualized block device.

In a third example aspect of the present disclosure, a computer-readable non-transitory storage medium comprises receive, from a virtual machine executing on a computer system, a request to access a snapshot of a first virtual disk of the virtual machine, wherein the request includes a snapshot identifier, select, by a hypervisor executing on the computer system, the snapshot using the snapshot identifier, create, by the hypervisor, a second virtual disk using the snapshot, map, by the hypervisor, the second virtual disk to the virtual machine, notify, by the hypervisor, the virtual machine that the snapshot on the second virtual disk is accessible, and access, by the virtual machine, the snapshot on the second virtual disk, wherein accessing the snapshot includes retrieving snapshot data from the second virtual disk without reverting a current virtual machine instance on the first virtual disk to the snapshot on the second virtual disk. In accordance with another example aspect of the present disclosure, which may be used in combination with any one or more of the preceding aspects, the snapshot identifier is at least one of a snapshot file name, a snapshot alphanumeric identifier, a snapshot address, and a snapshot timestamp. In accordance with another example aspect of the present disclosure, which may be used in combination with any one or more of the preceding aspects, the snapshot timestamp denotes at least one of an exact time stamp of the snapshot, a time after which the snapshot must be selected, and a time before which the snapshot must be selected. In accordance with another example aspect of the present disclosure, which may be used in combination with any one or more of the preceding aspects, responsive to receiving the request the hypervisor determines whether the virtual machine has rights to access the snapshot, and responsive to determining that the virtual machine has rights to access the snapshot, selecting by the hypervisor, the snapshot using the snapshot identifier. In accordance with another example aspect of the present disclosure, which may be used in combination with any one or more of the preceding aspects, responsive to accessing the snapshot the hypervisor unmaps the second virtual disk from the virtual machine. In accordance with another example aspect of the present disclosure, which may be used in combination with any one or more of the preceding aspects, accessing, by the virtual machine, the snapshot on the second virtual disk includes recovering, by the virtual machine, snapshot data on the first virtual disk that has been lost or modified. In accordance with another example aspect of the present disclosure, which may be used in combination with any one or more of the preceding aspects, creating, by the hypervisor, the second virtual disk includes invoking, by the hypervisor, a command to create a para-virtualized block device.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a memory;
a processor, in communication with the memory;
a virtual machine executing on the processor, the virtual machine including at least one virtual disk, and the memory including at least one snapshot of the at least one virtual disk of the virtual machine; and
a hypervisor, executing on the processors to:
  receive, from the virtual machine, a request to access a snapshot of a first virtual disk of the virtual machine, wherein the request includes a snapshot identifier and the snapshot of the first virtual disk includes a state of the first virtual disk;
  select, by the hypervisor, the snapshot using the snapshot identifier;
  create, by the hypervisor, a second virtual disk using the snapshot;
  map, by the hypervisor, the second virtual disk to the virtual machine;
  notify, by the hypervisor, the virtual machine that the snapshot on the second virtual disk is accessible; and
  access, by the virtual machine, the snapshot on the second virtual disk, wherein accessing the snapshot includes selectively retrieving snapshot data from the second virtual disk while continuously executing a current virtual machine instance on the first virtual disk.

2. The system of claim 1, wherein the snapshot identifier is at least one of a snapshot file name, a snapshot alphanumeric identifier, a snapshot address, and a snapshot timestamp.

3. The system of claim 2, wherein the snapshot timestamp denotes at least one of an exact time stamp of the snapshot, a time after which the snapshot must be selected, and a time before which the snapshot must be selected.

4. The system of claim 1, wherein responsive to receiving the request the hypervisor determines whether the virtual machine has rights to access the snapshot, and responsive to determining that the virtual machine has rights to access the snapshot, selecting by the hypervisor, the snapshot using the snapshot identifier.

5. The system of claim 1, wherein responsive to accessing the snapshot the hypervisor unmaps the second virtual disk from the virtual machine.

6. The system of claim 1, wherein accessing, by the virtual machine, the snapshot on the second virtual disk includes recovering, by the virtual machine, snapshot data on the first virtual disk that has been lost or modified.

7. The system of claim 1, wherein creating, by the hypervisor, the second virtual disk includes invoking, by the hypervisor, a command to create a para-virtualized block device.

8. A method, comprising:
receiving, from a virtual machine executing on a computer system, a request to access a snapshot of a first virtual disk of the virtual machine, wherein the request includes a snapshot identifier and the snapshot of the first virtual disk includes a state of the first virtual disk;
selecting, by a hypervisor executing on the computer system, the snapshot using the snapshot identifier;
creating, by the hypervisor, a second virtual disk using the snapshot;
mapping, by the hypervisor, the second virtual disk to the virtual machine;
notifying, by the hypervisor, the virtual machine that the snapshot on the second virtual disk is accessible; and
accessing, by the virtual machine, the snapshot on the second virtual disk, wherein accessing the snapshot includes selectively retrieving snapshot data from the second virtual disk while continuously executing a current virtual machine instance on the first virtual disk.

9. The method of claim 8, wherein the snapshot identifier is at least one of a snapshot file name, a snapshot alphanumeric identifier, a snapshot address, and a snapshot timestamp.

10. The method of claim 9, wherein the snapshot timestamp denotes at least one of an exact timestamp of the snapshot, a time after which the snapshot must be selected, and a time before which the snapshot must be selected.

11. The method of claim 8, further comprising responsive to receiving the request, determining, by the hypervisor, whether the virtual machine has rights to access the snapshot, and responsive to determining that the virtual machine has rights to access the snapshot, selecting by the hypervisor, the snapshot using the snapshot identifier.

12. The method of claim 8, further comprising responsive to accessing the snapshot, unmapping, by the hypervisor, the second virtual disk from the virtual machine.

13. The method of claim 8, wherein accessing, by the virtual machine, the snapshot on the second virtual disk includes recovering snapshot data on the first virtual disk that has been lost or modified.

14. The method of claim 8, wherein creating, by the hypervisor, the second virtual disk includes invoking, by the hypervisor, a command to create a para-virtualized block device.

15. A computer-readable non-transitory storage medium comprising executable instructions that, when executed by a computer system, cause the computer system to:
receive, from a virtual machine executing on a computer system, a request to access a snapshot of a first virtual disk of the virtual machine, wherein the request includes a snapshot identifier and the snapshot of the first virtual disk includes a state of the first virtual disk;
select, by a hypervisor executing on the computer system, the snapshot using the snapshot identifier;
create, by the hypervisor, a second virtual disk using the snapshot;
map, by the hypervisor, the second virtual disk to the virtual machine;
notify, by the hypervisor, the virtual machine that the snapshot on the second virtual disk is accessible; and
access, by the virtual machine, the snapshot on the second virtual disk, wherein accessing the snapshot includes selectively retrieving snapshot data from the second virtual disk while continuously executing a current virtual machine instance on the first virtual disk.

16. The computer-readable non-transitory storage medium of claim 15, wherein the snapshot identifier is at least one of a snapshot file name, a snapshot alphanumeric identifier, a snapshot address, and a snapshot timestamp.

17. The computer-readable non-transitory storage medium of claim 16, wherein the snapshot timestamp denotes at least one of an exact timestamp of the snapshot, a time after which the snapshot must be selected, and a time before which the snapshot must be selected.

18. The computer-readable non-transitory storage medium of claim 15, wherein responsive to receiving the request, the hypervisor determines whether the virtual machine has rights to access the snapshot, and responsive to determining that the virtual machine has rights to access the snapshot, selecting by the hypervisor, the snapshot using the snapshot identifier.

19. The computer-readable non-transitory storage medium of claim 15, wherein responsive to accessing the snapshot, the hypervisor unmaps the second virtual disk from the virtual machine.

20. The computer-readable non-transitory storage medium of claim 15, wherein accessing, by the virtual machine, the snapshot on the second virtual disk includes recovering snapshot data on the first virtual disk that has been lost or modified.

* * * * *